(12) United States Patent
Woo et al.

(10) Patent No.: US 12,038,492 B2
(45) Date of Patent: Jul. 16, 2024

(54) IN-VEHICLE PASSENGER DETECTION SYSTEM AND METHOD USING ULTRA-WIDE BAND RADAR

(71) Applicant: YURA CORPORATION CO., LTD., Seongnam-si (KR)

(72) Inventors: Sung Chul Woo, Seongnam-si (KR); Jong Seok Lim, Seongnam-si (KR)

(73) Assignee: YURA CORPORATION CO., LTD., Seongnam-si (KR)

(*) Notice: Subject to any disclaimer, the term of this patent is extended or adjusted under 35 U.S.C. 154(b) by 449 days.

(21) Appl. No.: 17/418,547

(22) PCT Filed: Dec. 12, 2019

(86) PCT No.: PCT/KR2019/017637
§ 371 (c)(1),
(2) Date: Jun. 25, 2021

(87) PCT Pub. No.: WO2020/138782
PCT Pub. Date: Jul. 2, 2020

(65) Prior Publication Data
US 2022/0075051 A1    Mar. 10, 2022

(30) Foreign Application Priority Data
Dec. 28, 2018    (KR) .................. 10-2018-0171506

(51) Int. Cl.
*G01S 13/56*    (2006.01)
*B60R 16/023*   (2006.01)
(Continued)

(52) U.S. Cl.
CPC ............ *G01S 13/56* (2013.01); *B60R 16/023* (2013.01); *G01S 7/003* (2013.01); *G01S 13/0209* (2013.01); *H04L 67/12* (2013.01)

(58) Field of Classification Search
CPC ...... G01S 13/56; G01S 7/003; G01S 13/0209; G01S 13/04; B60R 16/023; B60R 21/015; H04L 67/12
See application file for complete search history.

(56) References Cited

U.S. PATENT DOCUMENTS

2002/0140215 A1    10/2002  Breed et al.
2009/0261979 A1*   10/2009  Breed .................. B60N 2/2863
                                                      340/576
(Continued)

FOREIGN PATENT DOCUMENTS

DE    10 2005 020 847    11/2006
JP        2012075861      4/2012
(Continued)

OTHER PUBLICATIONS

Written Opinion with English translation for International Application No. PCT/KR2019/017637, dated Mar. 24, 2020.
(Continued)

*Primary Examiner* — Timothy A Brainard
*Assistant Examiner* — Kenneth W Good
(74) *Attorney, Agent, or Firm* — KILE PARK REED & HOUTTEMAN PLLC

(57) ABSTRACT

The present invention provides an in-vehicle passenger detection system and method using an Ultra-Wide Band radar. The present invention processes the values collected using an Ultra-Wide Band radar in the time domain, so that it is possible to detect passengers in a vehicle faster than the time required to process the collected values in the frequency domain using a conventional Ultra-Wide Band radar. Also, the present invention detects a large motion, such as a passenger's hand or foot movement in a vehicle, and a small motion, such as a passenger breathing quietly, using separate
(Continued)

data processing procedures, respectively, so that faster and more accurate passenger detection is possible.

12 Claims, 9 Drawing Sheets

(51) Int. Cl.
*G01S 7/00* (2006.01)
*G01S 13/02* (2006.01)
*H04L 67/12* (2022.01)

(56) References Cited

U.S. PATENT DOCUMENTS

| | | |
|---|---|---|
| 2012/0143786 A1 | 6/2012 | Karner |
| 2016/0200276 A1 | 7/2016 | Diewald |
| 2017/0158202 A1 | 6/2017 | Yang |
| 2018/0065504 A1 | 3/2018 | Lan et al. |
| 2019/0178980 A1* | 6/2019 | Zhang .................. A61B 5/7267 |
| 2021/0041554 A1* | 2/2021 | Ramesh .................. G01S 13/42 |
| 2021/0052176 A1* | 2/2021 | Sarely .................... G01S 13/04 |

FOREIGN PATENT DOCUMENTS

| | | |
|---|---|---|
| KR | 10-2017-0055352 | 5/2017 |
| KR | 10-2018-0024771 | 3/2018 |
| KR | 10-2018-0058915 | 6/2018 |
| KR | 10-2018-0095340 | 8/2018 |
| KR | 10-2018-0136790 | 12/2018 |
| WO | 2015037542 | 3/2015 |

OTHER PUBLICATIONS

International Search Report, with English translation, for International Application No. PCT/KR2019/017637, dated Mar. 24, 2020.

* cited by examiner

IN-VEHICLE PASSENGER DETECTION SYSTEM AND METHOD USING ULTRA-WIDE BAND RADAR

CROSS-REFERENCE TO RELATED APPLICATION(S)

This application is a national entry of International Application No. PCT/KR2019/017637, filed on Dec. 12, 2019, which claims under 35 U.S.C. § 119(a) and 365(b) priority to and benefits of Korean Patent Application No. 10-2018-0171506, filed on Dec. 28, 2018 in the Korean Intellectual Property Office, the entire contents of which are incorporated herein by reference.

TECHNICAL FIELD

The present invention relates to an in-vehicle passenger detection system and method, and more particularly, to an in-vehicle passenger detection system and method using an Ultra-Wide Band radar.

BACKGROUND ART

In recent hot summer, accidents are frequently occurring because children are neglected in a school vehicle. In order to prevent such an accident, in recent years, a technology that detects a passenger in a vehicle and informs the driver or manager is developed.

As a technology for detecting passengers in a vehicle, a technology using an ultrasonic sensor, a technology using an infrared sensor, a technology using a tilt sensor, and technologies combining the above technologies are introduced in various ways. However, these conventional techniques have disadvantages such as resolution, reaction speed, limit of measurement distance, and being affected by the surrounding environment a lot.

In order to secure the limitations of these sensors, recently, a technology for detecting passengers using an Ultra-Wide Band radar that operates at low power, has a fast response speed, and has a high resolution is under active research.

FIG. 1 is a diagram illustrating a typical method of detecting a passenger in a vehicle using an Ultra-Wide Band radar according to the prior art.

As shown in FIG. 1, as a method of detecting passengers in a vehicle using an Ultra-Wide Band radar, there is a method of recognizing whether a passenger is in a vehicle by detecting a frequency signal corresponding to respiration or heart rate in the frequency domain using Fourier transform after collecting received data for a long time in order to minimize noise caused by vehicle internal vibration and errors due to multiple reflections.

In the case of the prior art for detecting passengers using heart rate or respiration rate, it is less affected by the environment and has the advantage of high judgment accuracy, but it takes at least 30 to 40 seconds to collect the received data, and there is a disadvantage that it usually takes more than 1 minute to check the presence/absence of data on the respiratory rate and heart rate in the frequency domain using the processed data.

DISCLOSURE OF THE INVENTION

Technical Problem

The present invention is to provide an in-vehicle passenger detection system and method capable of quickly detecting passengers in a vehicle using an Ultra-Wide Band radar.

Technical Solution

According to a preferred embodiment of the present invention for solving the above-described problem, an in-vehicle passenger detection system includes: a transceiver configured to transmit an Ultra-Wide Band radar pulse signal at a predetermined time period and receive a reflected signal reflected by objects in a vehicle; a behavior detection module configured to detect a behavior of a passenger in the vehicle using the reflected signal; and a fine movement detection module configured to detect a breathing or heartbeat of the passenger in the vehicle by using the reflected signal.

In addition, the in-vehicle passenger detection system further includes a communication unit configured to transmit a passenger detection fact to a driver terminal or a manager terminal through a wired or wireless communication network when a passenger in the vehicle is detected by the behavior detection module and the fine movement detection module.

Furthermore, the behavior detection module generates frame data including a plurality of frame values representing a magnitude of the reflected signal obtained by sampling the reflected signal at a predetermined time period, generates and stores movement data by calculating a difference value between frame-by-frame values of frame data adjacent to each other in time, accumulates frame-by-frame values of the stored movement data, generates movement accumulation data, and compares the movement accumulation data with a threshold value to check the presence of passengers in the vehicle.

Moreover, the behavior detection module includes: a first signal magnitude operation unit configured to receive a reflected signal input from the transceiver, and generate and output frame data including a plurality of frame values representing a magnitude of the reflected signal obtained by sampling the reflected signal at a predetermined time period; a first movement data generation unit configured to generate movement data by calculating a difference value between frame-by-frame values of frame data adjacent to each other in time among a plurality of frame data output from the first signal magnitude operation unit; an accumulation operation unit configured to generate movement accumulation data by accumulating frame-by-frame values of movement data sequentially output from the first movement data generation unit; and a first movement determination unit configured to check the presence of a passenger in the vehicle by comparing each frame value of the movement accumulation data with a threshold value.

In addition, the in-vehicle passenger detection system further includes: a first frame data storage unit configured to store the frame data output from the first signal magnitude operation unit and output the stored frame data to the first movement data generation unit; and a movement data storage unit configured to sequentially stores movement data sequentially output from the first movement data generation unit and output the stored movement data to the accumulation operation unit.

Moreover, the fine movement detection module generates frame data including a plurality of frame values representing a magnitude of the reflected signal obtained by sampling the reflected signal at a predetermined time period, generates movement data by accumulating a value for each frame of frame data for a predetermined time among frame data, compares the movement data with a threshold value to check the presence of the passenger's breathing or heartbeat in the vehicle to count the presence, and determines that there is a passenger in the vehicle when the counted value reaches a predefined number of times.

Moreover, the fine movement detection module removes a background with little movement and noise appearing in the frame data from the frame data and stores the frame data with the noise removed, and accumulates frame data for a predetermined time for each frame among the frame data stored with the noise removed to generate movement data.

Moreover, the fine movement detection module includes: a second signal magnitude operation unit configured to receive a reflected signal input from the transceiver, calculate an absolute magnitude of the reflected signal, and generate and output frame data including a plurality of frame values representing a magnitude of a reflected signal over time; a noise removing unit configured to remove a background with little movement and noise appearing on the frame data from the frame data using a feedback loop; a second frame data storage unit configured to sequentially store frame data output from the noise removing unit; a second movement data generation unit configured to generate movement data by accumulating a value for each frame of frame data for a predetermined time among the frame data stored in the second frame data storage unit; a second movement determination unit configured to compare values of each frame of movement data with a predefined threshold value, and determine that there is movement when the frame exceeding the threshold value exists; and a counter configured to count the number of times that it is determined that there is the movement and notify the controller of the presence of passengers in the vehicle when the number of counts reaches a predefined number.

Furthermore, the noise removing unit includes: a subtractor configured to subtract a noise correction value ($B(k)=\alpha A(k-1)(1-\alpha)X(k-1)$) calculated in a previous operation cycle from frame data $A(k)$ input from the second signal magnitude operation unit and output a result $X(k)$; and a noise correction value generation unit configured to generate a noise correction value $B(k-1)$ using frame data $X(k-1)$ from which noise is removed and output from the subtractor in the previous operation cycle and frame data $A(k-1)$ input to the subtractor in the previous operation cycle and output the generated noise correction value $B(k-1)$ to the subtractor.

Moreover, the in-vehicle passenger detection system further includes a time limiting unit configured to remove frame values outside a predefined limit time from the frame data input from the noise removing unit and output frame data including only frame values within the limit time to the second frame data storage unit.

On the other hand, according to a preferred embodiment of the present invention for solving the above-described problem, an in-vehicle passenger detection method includes: (a) transmitting an Ultra-Wide Band radar pulse signal at a predetermined time period and receiving a reflected signal reflected by objects in a vehicle; (b) detecting a behavior of the passenger in the vehicle using the reflected signal; and (c) at the same time as step (b), detecting a breathing or heartbeat of the passenger in the vehicle using the reflected signal.

Moreover, the in-vehicle passenger detection method further includes, (d) when a passenger in the vehicle is detected, transmitting a passenger detection fact to a driver terminal or a manager terminal through a wired or wireless communication network.

In addition, the (b) step includes generating frame data including a plurality of frame values representing a magnitude of the reflected signal obtained by sampling the reflected signal at a predetermined time period, generating and storing movement data by calculating a difference value between frame-by-frame values of frame data adjacent to each other in time, generating movement accumulation data by accumulating frame-by-frame values of the stored movement data, and comparing the movement accumulation data with a threshold value to check the presence of passengers in the vehicle.

Furthermore, the (b) step includes: (b1) receiving a reflected signal input in the (a) step, and generating frame data including a plurality of frame values representing a magnitude of the reflected signal obtained by sampling the reflected signal at a predetermined time period; (b3) generating movement data by calculating a difference value between frame-by-frame values of frame data adjacent to each other in time among a plurality of frame data generated in the (b1) step; (b5) generating movement accumulation data by accumulating frame-by-frame values of movement data sequentially generated in the (b3) step; and (b6) checking the presence of a passenger in the vehicle by comparing each frame value of the movement accumulation data with a threshold value.

Furthermore, the in-vehicle passenger detection method further includes, between the (b1) step and the (b3) step, (b2) storing the frame data generated in the (b1) step, wherein the method further includes, between the (b3) step and the (b5) step, (b4) sequentially storing the movement data generated in the (b3) step, wherein in the step (b3) the movement data is generated by calculating a difference value between frame-by-frame values of frame data adjacent to each other in time among the plurality of frame data stored in the step (b2), wherein in the step (b5) the movement accumulation data is generated by accumulating frame-by-frame values of the movement data sequentially stored in the step (b4).

In addition, the (c) step includes generating frame data including a plurality of frame values representing a magnitude of the reflected signal obtained by sampling the reflected signal at a predetermined time period, generating movement data by accumulating a value for each frame of frame data for a predetermined time among frame data, comparing the movement data with a threshold value to check the presence of the passenger's breathing or heartbeat in the vehicle to count the presence, and determining that there is a passenger in the vehicle when the counted value reaches a predefined number of times.

Moreover, in the (c) step, the movement data is generated by removing a background with little movement and noise appearing in the frame data from the frame data and storing the frame data with the noise removed, and accumulating frame data for a predetermined time for each frame among the frame data stored with the noise removed to generate movement data.

Furthermore, the (c) step includes: (c1) receiving a reflected signal input in the (a) step, calculating an absolute magnitude of the reflected signal, and generating and outputting frame data including a plurality of frame values representing a magnitude of a reflected signal over time; (c2) removing a background with little movement and noise appearing on the frame data from the frame data; (c4)

sequentially storing the frame data with the noise removed; (c5) generating movement data by accumulating a value for each frame of frame data for a predetermined time among the frame data stored in the (c4) step; (c6) comparing values of each frame of movement data with a predefined threshold value, and determining that there is movement when the frame exceeding the threshold value exists; and (c7) counting the number of times that it is determined that there is the movement and determining that a passenger in the vehicle is detected when the number of counts reaches a predefined number of times.

Moreover, the step (c2) includes: generating a noise correction value $(B(k)=\alpha A(k-1)+(1-\alpha)X(k-1))$ using a frame data $X(k-1)$ from which noise is removed in a previous operation cycle and a frame data $A(k-1)$ input in the previous operation cycle; and subtracting a noise correction value $B(k)$ calculated in the previous operation cycle from a frame data $A(k)$ input in the step (c1) and outputting a result $X(k)$.

In addition, the in-vehicle passenger detection method further includes, between the (c2) and (c4) steps, (c3) removing frame values outside a predefined time limit from the frame data output in the step (c2), and generating frame data including only frame values within the time limit, wherein the frame data generated in the step (c3) is stored sequentially in the step (c4).

Advantageous Effects

The present invention can detect passengers in a vehicle faster than the time required to process the values collected using the conventional Ultra-Wide Band radar in the frequency domain by processing the values collected using the Ultra-Wide Band radar in the time domain.

In addition, the present invention detects a large movement, such as a passenger's hand or foot movement in a vehicle, and a small movement, such as a passenger breathing quietly, using separate data processing procedures, so that faster and more accurate passenger detection is possible.

MODE FOR CARRYING OUT THE INVENTION

Hereinafter, exemplary embodiments of the present invention will be described with reference to the accompanying drawings.

Figure 1:
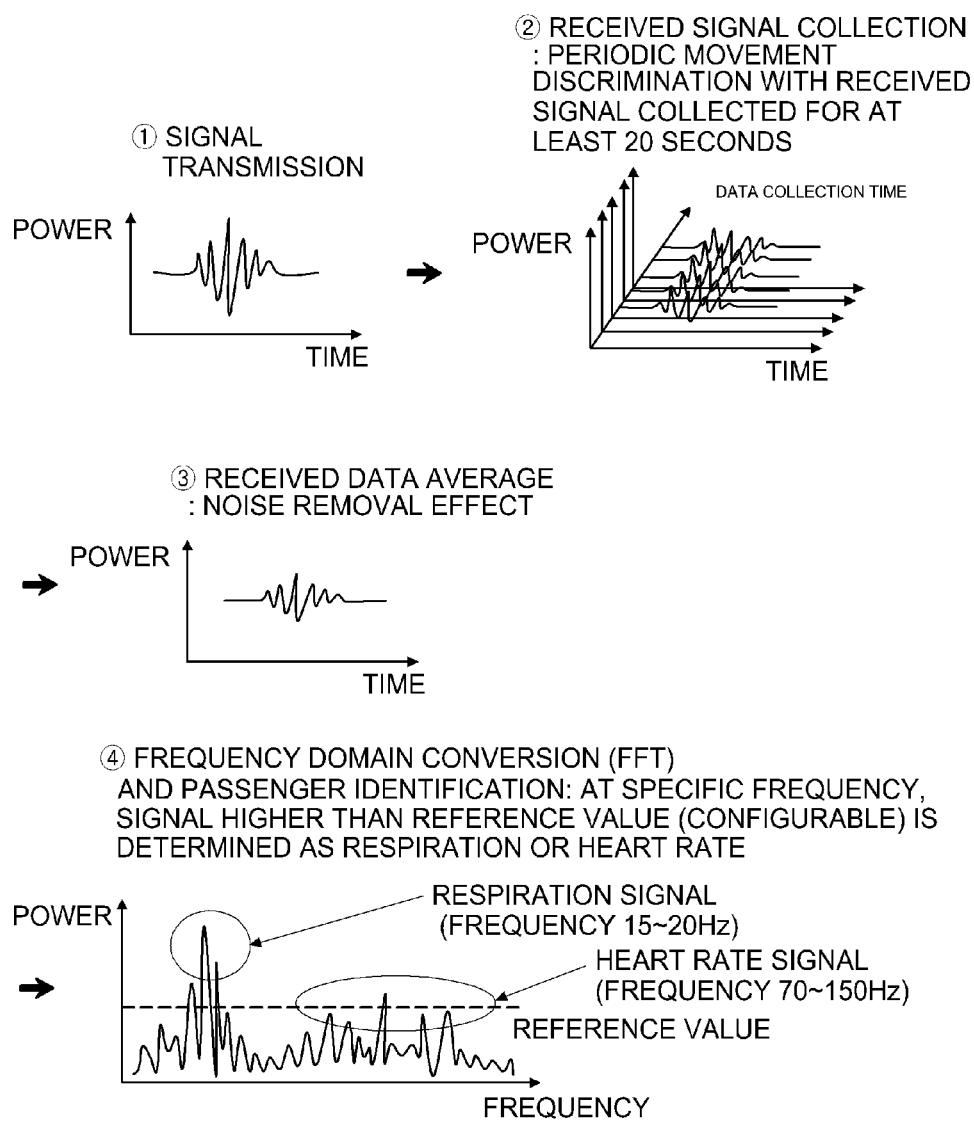
FIG. 1 is a diagram illustrating a typical method of detecting a passenger in a vehicle using an Ultra-Wide Band radar according to the prior art.
Figure 2:
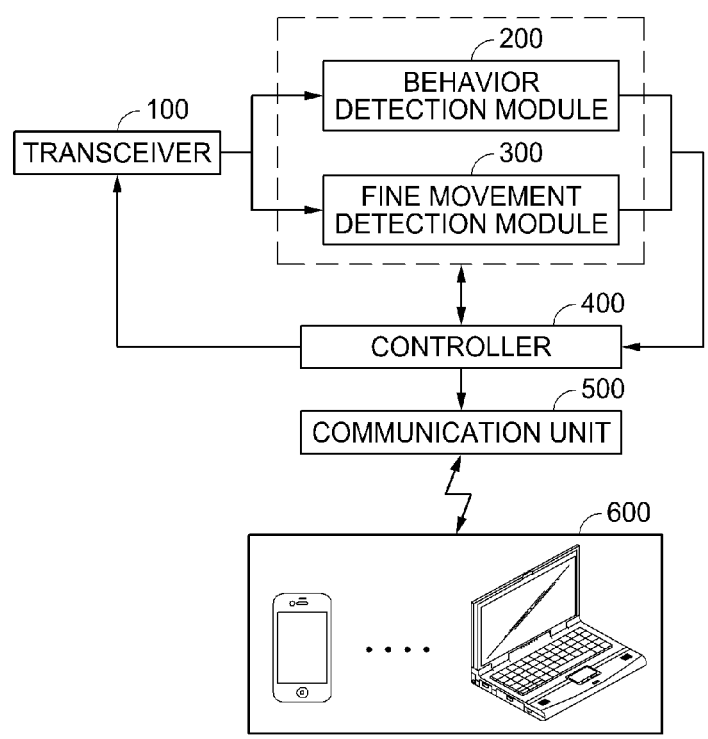
FIG. 2 is a diagram showing the overall configuration of an in-vehicle passenger detection system using an Ultra-Wide Band radar according to a preferred embodiment of the present invention.

FIG. 2 is a diagram showing the overall configuration of an in-vehicle passenger detection system using an Ultra-Wide Band radar according to a preferred embodiment of the present invention.

Referring to FIG. 2, an in-vehicle passenger detection system (hereinafter, "passenger detection system") using an Ultra-Wide Band radar according to a preferred embodiment of the present invention includes a transceiver 100 for transmitting Ultra-Wide Band radar pulse signals and receiving signals reflected by objects in the vehicle, a behavior detection module 200 for detecting a passenger's behavior in the vehicle (a large movement such as shaking a hand or moving a seat is defined as a behavior) using the reflected signal received through the transceiver 100, a fine movement detection module 300 for detecting the breathing or heartbeat of a passenger in the vehicle using the reflected signal received through the transceiver 100, a communication unit 500 for transmitting the passenger detection fact to the driver terminal 600 or the manager terminal 600 through a wired or wireless communication network when a passenger in the vehicle is detected, and a controller 400 for controlling the above components.

Referring to FIG. 2, when the overall operation of the in-vehicle passenger detection system and method according to a preferred embodiment of the present invention is described, first, the transceiver 100 is installed at a predefined position in the vehicle (e.g., front or rear of the vehicle), transmits Ultra-Wide Band radar signal pulses at a constant time period according to the control of the controller 400, and outputs the received reflected signals to the behavior detection module 200 and the fine movement detection module 300, respectively, when the reflected signal pulse reflected from various objects in the vehicle is received.

Each of the behavior detection module 200 and the fine movement module 300 receiving the reflected signal detects the behavior or fine movement of the passenger in the vehicle and outputs the detected behavior or fine movement to the controller 400, as described later with reference to FIGS. 3 to 6.

When a passenger in the vehicle is detected, the controller 400 transmits the fact that the passenger in the vehicle is detected through the communication unit 500 to the driver terminal 600 or the manager terminal 600.

Figure 3:
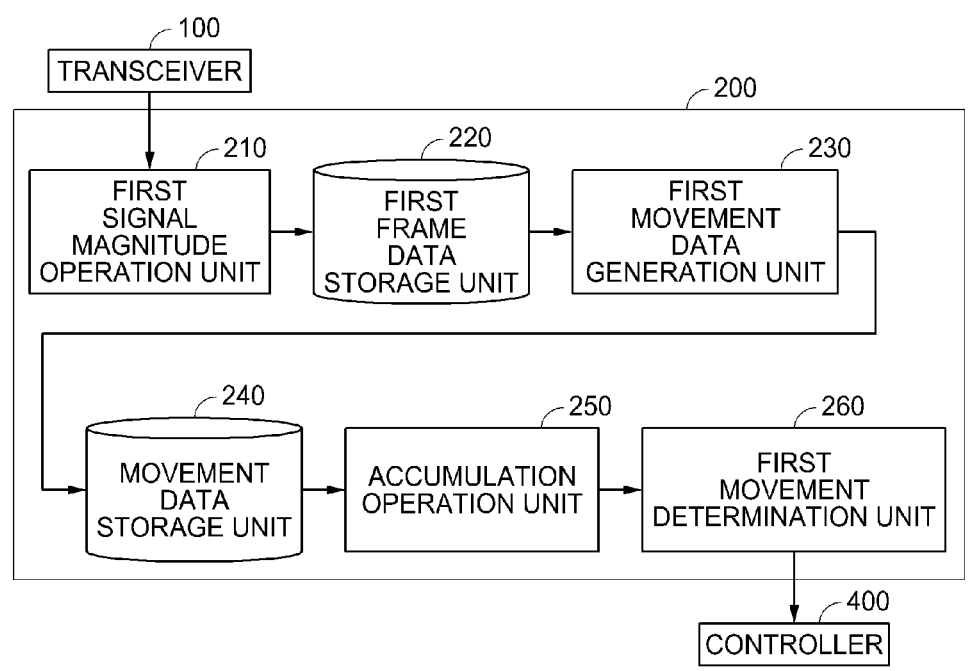
FIG. 3 is a block diagram showing a detailed configuration of a behavior detection module according to a preferred embodiment of the present invention.
Figure 4A:
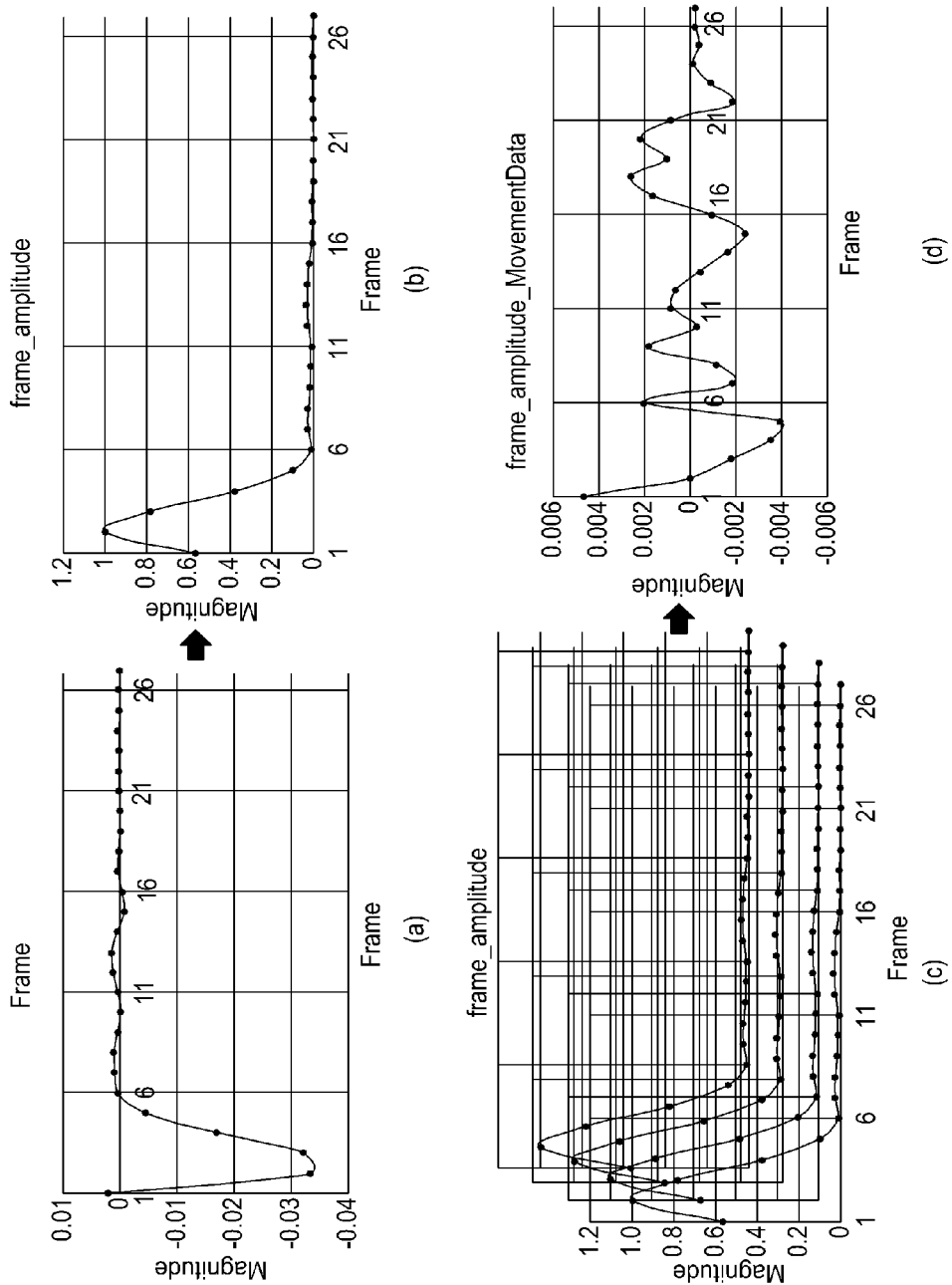
FIGS. 4A and 4B are diagrams illustrating a data processing flow performed in the behavior detection module of FIG. 3.
Figure 4B:
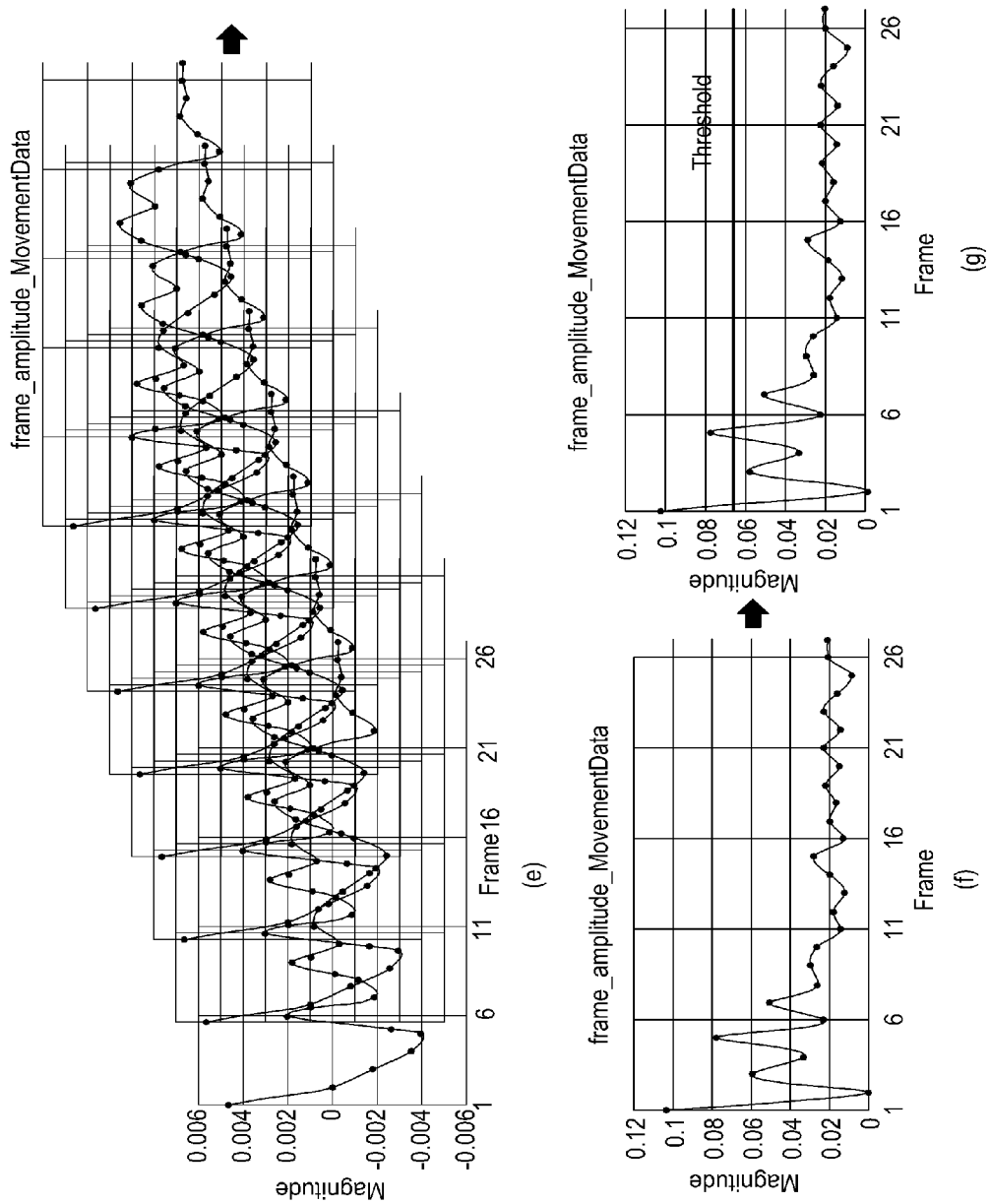

FIG. 3 is a block diagram showing a detailed configuration of a behavior detection module 200 according to a preferred embodiment of the present invention, and FIGS. 4A and 4B are diagrams illustrating a data processing flow performed by the behavior detection module 200 of FIG. 3.

When a detailed configuration and function of the behavior detection module 200 are described with reference to FIGS. 3, 4A and 4B, the behavior detection module 200 includes a first signal magnitude operation unit 210, a first frame data storage unit 220, a first movement data generation unit 230, a movement data storage unit 240, an accumulation operation unit 250, and a first movement determination unit 260.

The first signal magnitude operation unit 210 receives the reflected signal from the transceiver 100, calculates the absolute magnitude of the reflected signal, generates frame data including a plurality of frame values representing the magnitude of the reflected signal over time, and outputs the generated frame data to the first frame data storage unit 220.

As shown in (a) of FIG. 4A, after transmitting the pulse signal, the transceiver 100 samples and outputs the received signal at regular time periods, and each sampling time is defined as a frame, and the frame data includes a plurality of these frame values. The signal of (a) of FIG. 4A shows only 27 frames out of all frames of the received reflected signal. In this case, as the number of frames is smaller, it means that the signal pulse is transmitted from the transceiver and the reflected signal is received in a short time, and it represents a signal received by being reflected by the object at a short distance from the transceiver, and as the number of frames is larger, it represents a signal received by being reflected at a distance from the transceiver.

Since the reflected signal is expressed as a complex number, the first signal magnitude operation unit 210 calculates the signal magnitude by calculating the magnitude of the complex number, and as shown in (b) of FIG. 4A, outputs the frame data mapped to the signal magnitude for each frame to the first frame data storage unit 220.

As shown in (c) of FIG. 4A, the first frame data storage unit 220 accumulatively stores frame data input from the first signal magnitude operation unit 210 for a predetermined time, and enables the first movement data generation unit 230 to sequentially use the stored frame data according to the time order.

The first movement data generation unit 230 generates movement data by obtaining a difference between the same frame of two temporally adjacent frame data among frame data of a plurality of times stored in the first frame data storage unit 220.

For example, in the examples shown in (b) and (c) of FIG. 4A, it can be seen that frame data received and stored from the transceiver 100 have a large peak value in frame 2. This means that an object exists at a very close distance from the transceiver 100. However, if such an object has no movement at all, it is likely not the passenger, but the back of the seat closest to the transceiver 100.

On the other hand, assuming that frame data is generated every 0.2 seconds, when a large value is detected in frame 5 in 0.2 seconds, a large value is detected in frame 7 in 0.4 seconds, a large value is detected in 10 frames in 0.6 seconds, and a large value is detected as the frame changes between frame 5 and frame 10 after that, this means that the passenger is moving at a distance between frame 5 and frame 10.

Accordingly, a preferred embodiment of the present invention accumulates the difference between the same frame values in the frame data of these adjacent times, and checks whether or not movement is detected at a distance corresponding to each frame.

For this, the first movement data generation unit 230 generates movement data by obtaining a difference between the same frame of two temporally adjacent frame data among frame data of a plurality of times stored in the first frame data storage unit 220.

For example, assuming that frame data A, B, C, D, E, . . . are stored in the first frame data storage unit 220 in chronological order, the movement data storage unit 240 generates movement data for each frame included in the frame data in the A-B, B-C, C-D, D-E, . . . method, and the movement data has the same number of frames as the frame data. (d) of FIG. 4A shows an example of movement data.

The movement data storage unit 240 stores movement data received from the first movement data generation unit 230 in chronological order, as shown in (e) of FIG. 4B.

Thereafter, the accumulation operation unit 250 accumulates movement data stored in the movement data storage unit 240 for a predetermined time for each frame to generate movement accumulation data. (f) of FIG. 4B is a diagram illustrating an example of movement accumulation data. By accumulating movement data in this way, the effect of noise can be minimized. In addition, movement can be tracked by comparing movement accumulation data generated in a certain time unit in chronological order.

Then, as shown in (g) of FIG. 4B, the first movement determination unit 260 compares the movement accumulation data with a preset threshold to determine whether a passenger is present in the vehicle. In the example shown in (g) of FIG. 4B, since the frames exceeding the threshold are the first frame (frame 1) and the fifth frame (frame 5), it can be seen that there is a moving object in a very close position from the transceiver.

Figure 5A:
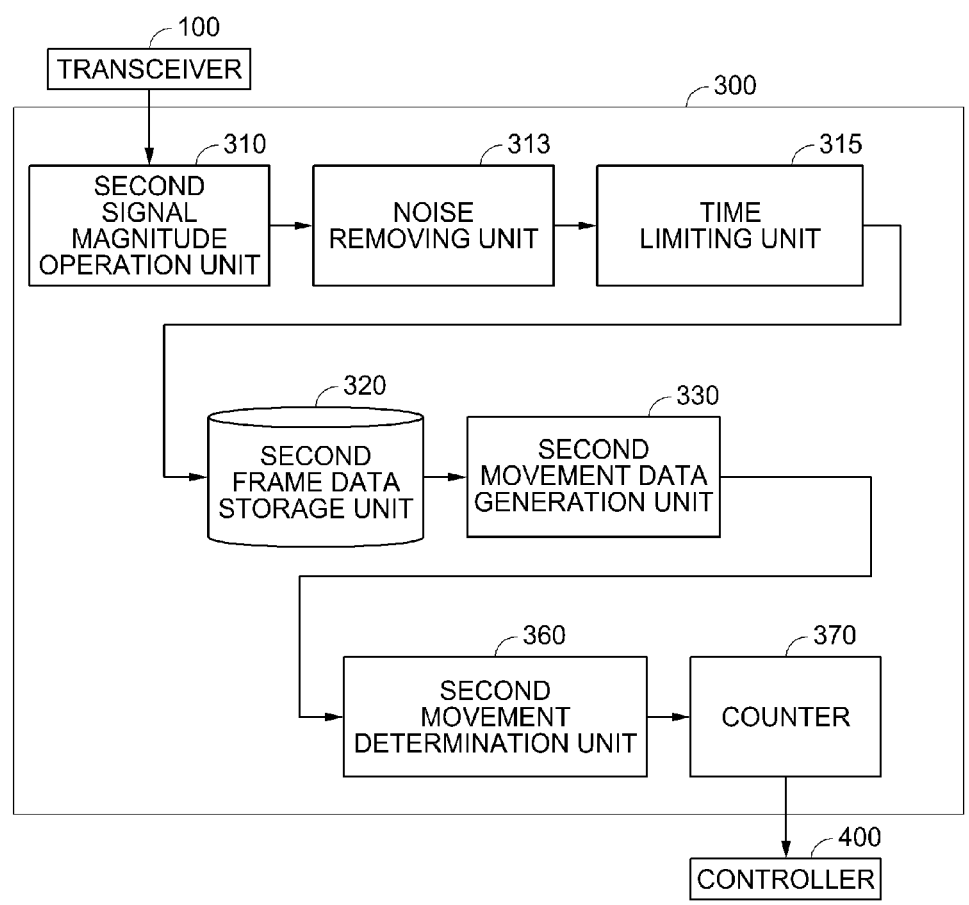
FIGS. 5A and 5B are block diagrams showing a detailed configuration of a fine movement detection module according to a preferred embodiment of the present invention.
Figure 5B:
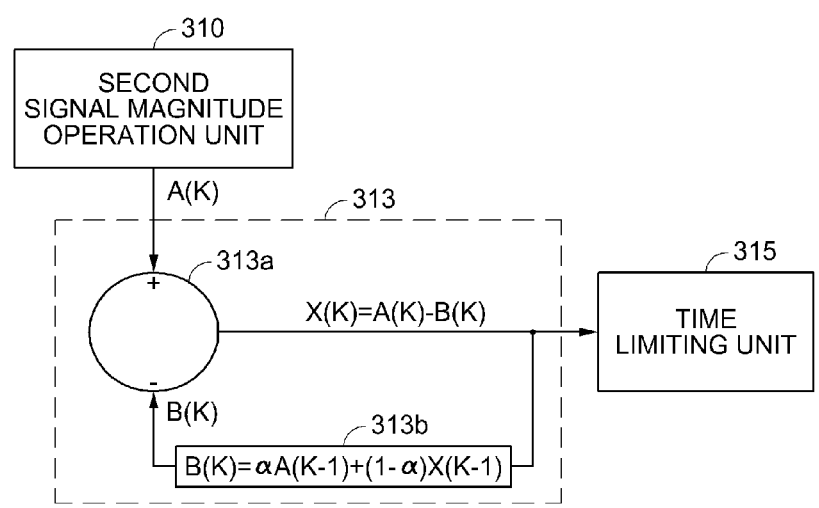
Figure 6A:
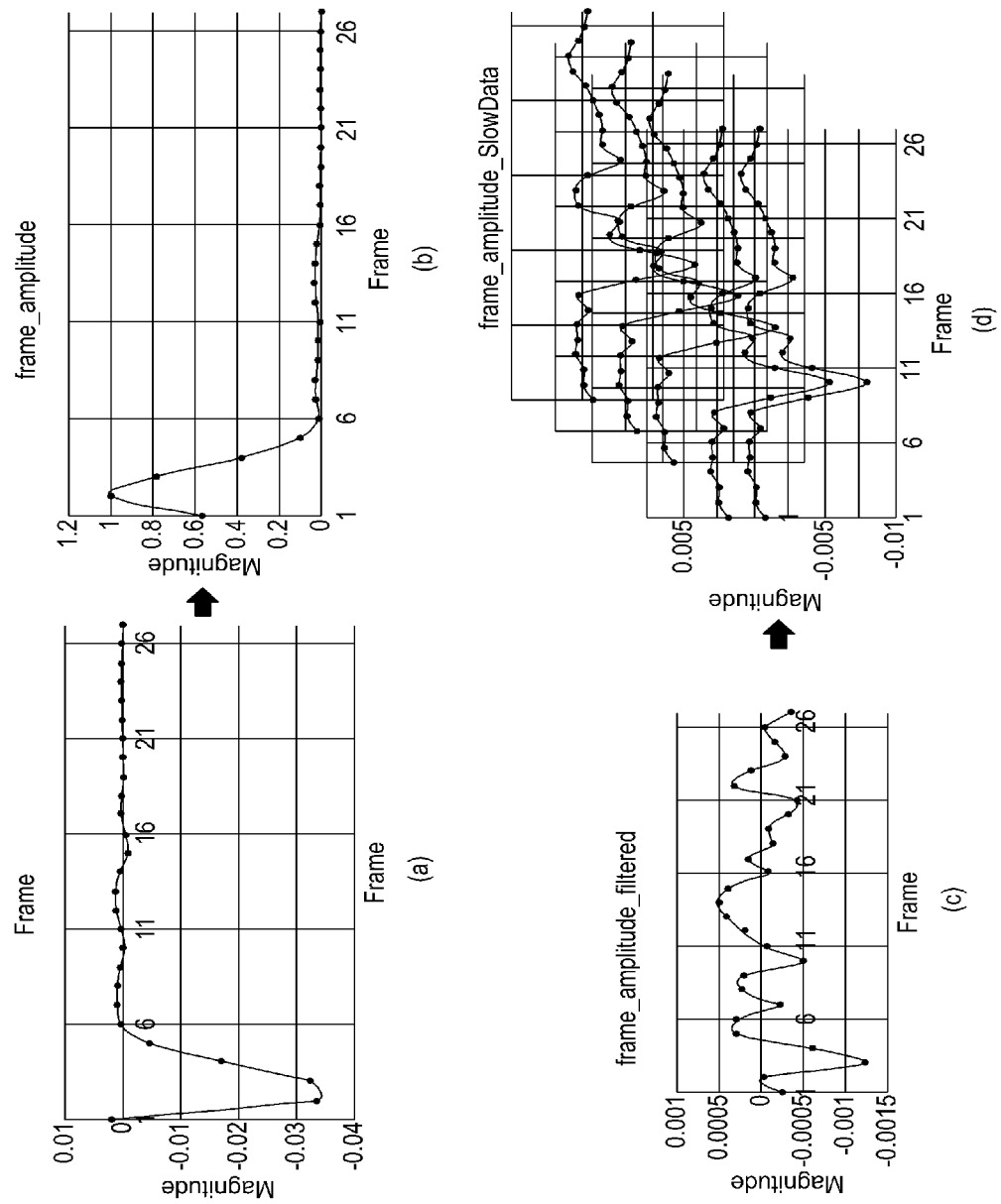
FIGS. 6A and 6B are diagrams illustrating a data processing flow performed in the fine movement detection module of FIG. 5A.
Figure 6B:
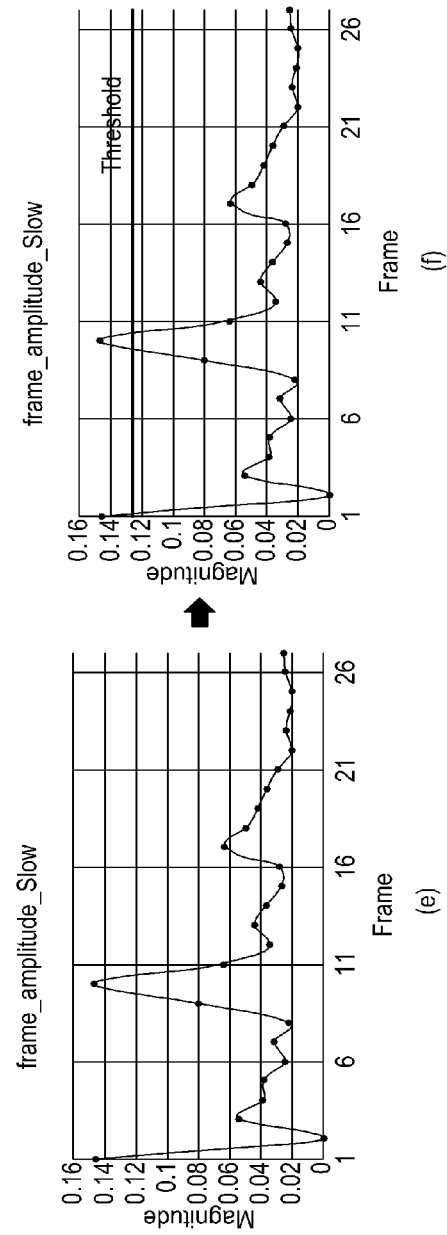

FIGS. 5A and 5B are block diagrams showing a detailed configuration of a fine movement detection module 300 according to a preferred embodiment of the present invention, and FIGS. 6A and 6B are diagrams illustrating a data processing flow performed by the fine movement detection module 300 of FIG. 5A.

Referring to FIGS. 5A and 5B and 6A and 6B, the fine movement detection module 300 according to a preferred embodiment of the present invention includes a second signal magnitude operation unit 310, a noise controller 400, a time limiting unit 315, a second frame data storage unit 320, a second movement data generation unit 330, a second movement determination unit 360, and a counter 370. In addition, the noise removing unit 313 includes a subtractor 313a and a noise correction value generation unit 313b.

First, the reflected signal received from the transceiver 100 is output to the second signal magnitude operation unit 310 (see (a) of FIG. 6A), and the second signal magnitude operation unit 310 receives the reflected signal from the transceiver 100, calculates the absolute magnitude of the reflected signal, and outputs the frame data A(k) to the noise removing unit 313. (see (b) of FIG. 6A). Since the function of the second signal magnitude operation unit 310 is the same as that of the first signal magnitude operation unit 210, a detailed description will be omitted.

The noise removing unit 313 removes a background with little movement and noise appearing on the frame data from the frame data using a feedback loop.

Referring to FIG. 5B, a subtraction operation according to Equation 1 below is performed on the frame data A(k) input from the second signal magnitude operation unit 310 with the noise correction value B(k) output from the noise correction value generation unit 313b such that the result X(k) is output to the time limiting unit 315.

$$X(k)=A(k)-B(k) \qquad \text{[Equation 1]}$$

The noise correction value generation unit 313b performs an operation according to Equation 2 below using the operation result X(k) of Equation 1 output to the time limiting unit 315 and frame data A(k) input to the subtractor 313a and generates a noise correction value B(k) to output the generated noise correction value B(k) to the subtractor 313a.

$$B(k)=\alpha A(k-1)+(1-\alpha)X(k-1) \qquad \text{[Equation 2]}$$

In Equation 2, $\alpha$ is a weight coefficient of $0<\alpha<1$.

The subtractor 313a newly receives the frame data A(k) from the second signal magnitude operation unit 310, subtracts the noise correction value $B(k)=\alpha A(k-1)+(1-\alpha)X(k-1))$ calculated in the previous operation cycle from the newly input frame data A(k), and outputs the result X(k) to the time limiting unit 315 (see (c) of FIG. 6A).

Through the feedback operation as described above, frame values representing a motionless object and unexpectedly input noise on the frame data are removed.

The time limiting unit 315 limits the time during which the transceiver 100 transmits the pulse signal and receives the reflected signal in the frame data to a predefined time to remove frame values outside the limited time and output frame data including only frame values within the limited time to the second frame data storage unit 320.

The second frame data storage unit 320 stores frame data input from the time limiting unit 315 (see (d) of FIG. 6A), and the second movement data generation unit 330 accumulates a value of frame data for a predetermined time for each frame among the frame data stored in the second frame data storage unit 320, generates movement data, and outputs the movement data to the second movement determination unit 360 (see (e) of FIG. 6B). In a preferred embodiment of the present invention, each frame value of frame data for 5 seconds is accumulated, but the accumulation time may be set according to the environment.

Thereafter, the second movement determination unit 360 compares the values of each frame of movement data input from the second movement data generation unit 330 with a predefined threshold, and if there is a frame exceeding the threshold, determines that there is movement and notifies the counter 370 that movement is detected (see (f) of FIG. 6B).

When the movement detection result is notified from the second movement determination unit 360, the counter 370 increments the internal counter by 1, and when the counter value reaches a predefined value, the counter 370 outputs that a fine movement is detected to the controller 400. The fine movement detection module of the present invention is a configuration that detects fine movement such as heartbeat or respiration, and such microscopic movement can also occur due to the influence of the surrounding environment or noise. Therefore, in a preferred embodiment of the present invention, when such a fine movement is detected as many times as a predefined number for a certain period of time, it can be determined that a passenger with periodic breathing or periodic heartbeat exists in the vehicle.

The present invention can also be implemented as a computer-readable code on a computer-readable recording medium. The computer-readable recording medium includes all types of recording devices that store data that can be read by a computer system. Examples of computer-readable recording media include ROM, RAM, CD-ROM, magnetic tapes, floppy disks, and optical data storage devices. In addition, the computer-readable recording medium can be distributed over a computer system connected through a network to store and execute computer-readable codes in a distributed manner.

So far, the present invention is examined based on its preferred embodiments. Those of ordinary skill in the art to which the present invention pertains will be able to understand that the present invention may be implemented in a modified form without departing from the essential characteristics of the present invention. Therefore, the disclosed embodiments should be considered from an illustrative point of view rather than a limiting point of view. The scope of the present invention is shown in the claims rather than the above description, and all differences within the scope equivalent thereto should be construed as being included in the present invention.

The invention claimed is:

1. An in-vehicle passenger detection system comprising:
a transceiver configured to transmit an Ultra-Wide Band radar pulse signal at a predetermined time period and receive a reflected signal reflected by objects in a vehicle;
a behavior detection module configured to detect a behavior of a passenger in the vehicle using the reflected signal; and
a fine movement detection module configured to detect a breathing or heartbeat of the passenger in the vehicle by using the reflected signal,
wherein the fine movement detection module comprises:
a second signal magnitude operation unit configured to receive a reflected signal input from the transceiver, calculate an absolute magnitude of the reflected signal, and generate and output frame data including a plurality of frame values representing a magnitude of a reflected signal over time;
a noise removing unit configured to remove a background and noise appearing on the frame data from the frame data using a feedback loop;
a second frame data storage unit configured to sequentially store frame data output from the noise removing unit;
a second movement data generation unit configured to generate movement data by accumulating a value for each frame of frame data for a predetermined time among the frame data stored in the second frame data storage unit;
a second movement determination unit configured to compare values of each frame of movement data with a predefined threshold value, and determine that there is movement when the frame exceeding the threshold value exists; and
a counter configured to count the number of times that it is determined that there is the movement and notify a controller of the presence of passengers in the vehicle when the number of counts reaches a predefined number, and
wherein the noise removing unit comprises:
a subtractor configured to subtract a noise correction value $(B(k)=\alpha A(k-1)(1-\alpha)X(k-1))$ ($\alpha$ is a weight coefficient of $0 \leq \alpha < 1$) calculated in a previous operation cycle from frame data $A(k)$ input from the second signal magnitude operation unit and output a result $X(k)$; and
a noise correction value generation unit configured to generate a noise correction value $B(k-1)$ using frame data $X(k-1)$ from which noise is removed and output from the subtractor in the previous operation cycle and frame data $A(k-1)$ input to the subtractor in the previous operation cycle and output the generated noise correction value $B(k-1)$ to the subtractor.

2. The in-vehicle passenger detection system of claim 1, further comprising a communication unit configured to transmit a passenger detection fact to a driver terminal or a manager terminal through a wired or wireless communication network when a passenger in the vehicle is detected by the behavior detection module and the fine movement detection module.

3. The in-vehicle passenger detection system of claim 1, wherein the behavior detection module generates frame data including a plurality of frame values representing a magnitude of the reflected signal obtained by sampling the reflected signal at a predetermined time period, generates and stores movement data by calculating a difference value between frame-by-frame values of frame data adjacent to each other in time, accumulates frame-by-frame values of the stored movement data, generates movement accumulation data, and compares the movement accumulation data with a threshold value to check the presence of passengers in the vehicle.

4. The in-vehicle passenger detection system of claim 3, wherein the behavior detection module comprises:
- a first signal magnitude operation unit configured to receive a reflected signal input from the transceiver, and generate and output frame data including a plurality of frame values representing a magnitude of the reflected signal obtained by sampling the reflected signal at a predetermined time period;
- a first movement data generation unit configured to generate movement data by calculating a difference value between frame-by-frame values of frame data adjacent to each other in time among a plurality of frame data output from the first signal magnitude operation unit;
- an accumulation operation unit configured to generate movement accumulation data by accumulating frame-by-frame values of movement data sequentially output from the first movement data generation unit; and
- a first movement determination unit configured to check the presence of a passenger in the vehicle by comparing each frame value of the movement accumulation data with a threshold value.

5. The in-vehicle passenger detection system of claim 4, further comprising:
- a first frame data storage unit configured to store the frame data output from the first signal magnitude operation unit and output the stored frame data to the first movement data generation unit; and
- a movement data storage unit configured to sequentially stores movement data sequentially output from the first movement data generation unit and output the stored movement data to the accumulation operation unit.

6. The in-vehicle passenger detection system of claim 1, further comprising a time limiting unit configured to remove frame values outside a predefined limit time from the frame data input from the noise removing unit and output frame data including only frame values within the limit time to the second frame data storage unit.

7. An in-vehicle passenger detection method performed in an in-vehicle passenger detection system, the method comprising:
- (a) transmitting an Ultra-Wide Band radar pulse signal at a predetermined time period and receiving a reflected signal reflected by objects in a vehicle;
- (b) detecting a behavior of the passenger in the vehicle using the reflected signal; and
- (c) at the same time as step (b), detecting a breathing or heartbeat of the passenger in the vehicle using the reflected signal, wherein the (c) step comprises:
- (c1) receiving a reflected signal input in the (a) step, calculating an absolute magnitude of the reflected signal, and generating and outputting frame data including a plurality of frame values representing a magnitude of a reflected signal over time;
- (c2) removing a background and noise appearing on the frame data from the frame data;
- (c4) sequentially storing the frame data with the noise removed;
- (c5) generating movement data by accumulating a value for each frame of frame data for a predetermined time among the frame data stored in the (c4) step;
- (c6) comparing values of each frame of movement data with a predefined threshold value, and determining that there is movement when the frame exceeding the threshold value exists; and
- (c7) counting the number of times that it is determined that there is the movement and determining that a passenger in the vehicle is detected when the number of counts reaches a predefined number of times, wherein the step (c2) comprises:
- generating a noise correction value ($B(k)=\alpha A(k-1)(1-\alpha)X(k-1)$) ($\alpha$ is a weight coefficient of $0<\alpha<1$) using a frame data $X(k-1)$ from which noise is removed in a previous operation cycle and a frame data $A(k-1)$ input in the previous operation cycle; and
- subtracting a noise correction value $B(k)$ calculated in the previous operation cycle from a frame data $A(k)$ input in the step (c1) and outputting a result $X(k)$.

8. The in-vehicle passenger detection method of claim 7, further comprising, (d) when a passenger in the vehicle is detected, transmitting a passenger detection fact to a driver terminal or a manager terminal through a wired or wireless communication network.

9. The in-vehicle passenger detection method of claim 7, wherein the (b) step comprises generating frame data including a plurality of frame values representing a magnitude of the reflected signal obtained by sampling the reflected signal at a predetermined time period, generating and storing movement data by calculating a difference value between frame-by-frame values of frame data adjacent to each other in time, generating movement accumulation data by accumulating frame-by-frame values of the stored movement data, and comparing the movement accumulation data with a threshold value to check the presence of passengers in the vehicle.

10. The in-vehicle passenger detection method of claim 9, wherein the (b) step comprises:
- (b1) receiving a reflected signal input in the (a) step, and generating frame data including a plurality of frame values representing a magnitude of the reflected signal obtained by sampling the reflected signal at a predetermined time period;
- (b3) generating movement data by calculating a difference value between frame-by-frame values of frame data adjacent to each other in time among a plurality of frame data generated in the (b1) step;
- (b5) generating movement accumulation data by accumulating frame-by-frame values of movement data sequentially generated in the (b3) step; and
- (b6) checking the presence of a passenger in the vehicle by comparing each frame value of the movement accumulation data with a threshold value.

11. The in-vehicle passenger detection method of claim 9, further comprising, between the (b1) step and the (b3) step, (b2) storing the frame data generated in the (b1) step,
wherein the method further comprises, between the (b3) step and the (b5) step, (b4) sequentially storing the movement data generated in the (b3) step,
wherein in the step (b3), the movement data is generated by calculating a difference value between frame-by-frame values of frame data adjacent to each other in time among the plurality of frame data stored in the step (b2),
wherein in the step (b5), the movement accumulation data is generated by accumulating frame-by-frame values of the movement data sequentially stored in the step (b4).

12. The in-vehicle passenger detection method of claim 7, further comprising, between the (c2) and (c4) steps, (c3) removing frame values outside a predefined time limit from the frame data output in the step (c2), and generating frame data including only frame values within the time limit, wherein the frame data generated in the step (c3) is stored sequentially in the step (c4).

* * * * *